(12) United States Patent
Hasegawa et al.

(10) Patent No.: US 7,101,919 B2
(45) Date of Patent: Sep. 5, 2006

(54) INKJET, INKJET CARTRIDGE CONTAINING THE INKJET INK, INKJET RECORDING APPARATUS USING THE INKJET INK, INKJET RECORDING METHOD USING THE INKJET INK, AND IMAGE FORMED BY THE INKJET RECORDING METHOD

(75) Inventors: Shin Hasegawa, Numazu (JP); Keishi Taniguchi, Susono (JP); Minoru Hakiri, Numazu (JP); Yasuyuki Hosogi, Numazu (JP)

(73) Assignee: Ricoh Company Limited, Tokyo (JP)

( * ) Notice: Subject to any disclaimer, the term of this patent is extended or adjusted under 35 U.S.C. 154(b) by 134 days.

(21) Appl. No.: 10/694,043

(22) Filed: Oct. 28, 2003

(65) Prior Publication Data

US 2004/0138337 A1 Jul. 15, 2004

(30) Foreign Application Priority Data

Oct. 29, 2002 (JP) ............................. 2002-314779
Feb. 7, 2003 (JP) ............................. 2003-03168
May 30, 2003 (JP) ............................. 2003-153739

(51) Int. Cl.
  *C09D 11/10* (2006.01)
  *C08L 75/04* (2006.01)
  *C08L 83/06* (2006.01)
(52) U.S. Cl. ...................... 523/160; 524/590; 524/837
(58) Field of Classification Search ................ 523/160, 523/161
See application file for complete search history.

(56) References Cited

U.S. PATENT DOCUMENTS

| 5,772,746 | A | * | 6/1998 | Sawada et al. | .......... 106/31.86 |
| 5,883,653 | A | * | 3/1999 | Sasaki | .......... 347/86 |
| 5,928,419 | A | * | 7/1999 | Uemura et al. | .......... 106/493 |
| 6,063,835 | A | | 5/2000 | Ohshima et al. | |
| 6,565,642 | B1 | | 5/2003 | Taniguchi et al. | |
| 6,702,889 | B1 | * | 3/2004 | Shigeo et al. | .......... 106/493 |
| 6,786,959 | B1 | * | 9/2004 | Hakiri et al. | .......... 106/31.86 |
| 2001/0029273 | A1 | * | 10/2001 | Taniguchi et al. | .......... 523/161 |
| 2002/0112644 | A1 | * | 8/2002 | Nakamura et al. | .......... 106/401 |
| 2003/0166742 | A1 | * | 9/2003 | Hirasa et al. | .......... 523/160 |

FOREIGN PATENT DOCUMENTS

| EP | 0 767 225 | | 4/1997 |
| EP | 0 933 406 | | 8/1999 |
| EP | 1 041 126 | | 10/2000 |
| EP | 1116757 A2 | * | 7/2001 |
| JP | 56-147863 | | 11/1981 |
| JP | 61-83267 | | 4/1986 |
| JP | 5-105834 | | 4/1993 |
| JP | 8-244254 | | 9/1996 |
| JP | 10-44473 | | 2/1998 |
| JP | 10-88050 | | 4/1998 |
| JP | 10-168367 | | 6/1998 |
| JP | 2001-192583 | | 7/2001 |
| JP | 2001348523 A | * | 12/2001 |
| WO | WO 99/05230 | | 2/1999 |

OTHER PUBLICATIONS

Machine Translation of JP 2001-348523 A (2001).*
Derwent Publications, XP-002264702, JP 7-305006, Nov. 21, 1995.

* cited by examiner

*Primary Examiner*—Callie Shosho
(74) *Attorney, Agent, or Firm*—Oblon, Spivak, McClelland, Maier & Neustadt, P.C.

(57) ABSTRACT

An inkjet ink including water; a particulate pigment; a dispersant; and an emulsion, wherein the particulate pigment has an average particle diameter (D50) not greater than 100 nm, and the standard deviation of particle diameter distribution of the particulate pigment is less than one half of the average particle diameter (D50). An inkjet cartridge containing the inkjet ink. An inkjet recording apparatus including the inkjet cartridge and a carriage configured to carry the ink cartridge. An inkjet recording method including discharging the inkjet ink from a nozzle of a recording head to form an ink image on a recording paper. An image formed on a recording material in accordance with the inkjet recording method.

14 Claims, 3 Drawing Sheets

INKJET, INKJET CARTRIDGE CONTAINING THE INKJET INK, INKJET RECORDING APPARATUS USING THE INKJET INK, INKJET RECORDING METHOD USING THE INKJET INK, AND IMAGE FORMED BY THE INKJET RECORDING METHOD

BACKGROUND OF THE INVENTION

1. Field of the Invention

The present invention relates to an inkjet ink, an ink cartridge containing the inkjet ink, an inkjet recording apparatus which records an image by discharging the inkjet ink, an inkjet recording method for recording an image using the inkjet ink, and an image formed by the inkjet recording method.

2. Discussion of the Background

Inkjet recording methods have the following advantages over other recording methods:

(1) The recording process thereof is relatively simple compared to other recording methods and therefore full color images can be easily produced; and
(2) inkjet printers can produce high-resolution color images although they have a simple constitution.

Dye-based inkjet inks in which a water-soluble dye is dissolved in water or a mixture solvent of water and an organic solvent have been typically used as inkjet inks. However, dye-based inkjet inks have a drawback in that the resultant images have poor light resistance, although the dye-based inkjet inks can produce color images having good clearness. Therefore, pigment-based inkjet inks in which one or more pigments such as carbon black and various organic pigments are dispersed have been investigated because the resultant images have a relatively good light resistance compared to those of the dye-based inkjet inks.

Such pigment-based inkjet inks are typically prepared by mechanically pulverizing and dispersing one or more pigments, such as organic pigments and carbon black, a dispersing medium and a dispersant. In this case, unless the pigments are finely and stably dispersed in the dispersion medium while having a small particle diameter, the resultant ink cannot form images having good transparency, high resolution and good color reproducibility. In addition, such an inkjet ink causes a clogging problem in that the nozzles from which the ink is to be discharged are clogged with the large pigment particles included in the resultant inkjet ink. However, in general there is a certain limit to the particle diameter of pigment particles in an inkjet ink which is prepared by a method utilizing a mechanical pulverization/dispersion operation. Even when an ink in which a pigment is finely dispersed can be prepared, the pigment ink tends to cause a problem such that the pigment agglomerates when the ink is preserved, i.e., the ink has poor preservability.

In attempting to solve the clogging problem and improve color reproducibility, various methods in which the pigment used for an ink is pulverized and dispersed so as to have a small particle diameter in the ink have been proposed. For example, published unexamined Japanese Patent Application No. (hereinafter referred to as JOP) 56-147863 discloses inks including a polymer dispersant such as styrene-acrylic copolymers or styrene-maleic acid copolymers. JOP 61-083267 discloses inks including a polymer dispersant such as condensates of sodium naphthalenesulfonate with formalin. JOPs 05-105837, 10-168367 and 10-088050 have disclosed inks including a surfactant such as polyethyleneglycol alkylphenyl ethers, sulfates of polyethyleneglycol alkylphenyl ethers, and phosphates of polyethyleneglycol alkylphenyl ethers. However, the pigments included in these inks have large average particle diameter, and thereby the inks have poor discharging stability and preservability. In addition, the resultant images have poor clearness.

Conventional inkjet printers produce full color images using (i.e., mixing) a yellow ink (Y), a magenta ink (M), a cyan ink (C), and a black ink (K). However, there is a limit to the color reproducibility of the resultant full color images when the images are prepared by mixing such yellow, magenta, cyan and black inks. In particular, secondary color images, i.e., red (R), green (G) and blue (B) images, have to be prepared by mixing two or more of the Y, M, C and K inks. Therefore, color images having good chromaticness cannot be produced.

In attempting to improve the color reproducibility of such secondary color images and prevent blurring of the secondary color images due to mixing of two or more inks, JOPs 08-244254 and 10-044473 have disclosed image forming methods using seven color inks, i.e., Y, M, C, K, R, G and B inks. However, when such seven inks are used, the number of the inkjet heads has to be increased, thereby causing a problem such that the manufacturing cost of the inkjet recording apparatus increases. In addition, it takes a long time and is troublesome to perform maintenance on such inkjet recording apparatus. Further, it takes a relatively long time to convert image signals to output signals, i.e., image processing time increases. Thereby, a problem in that the recording speed of the inkjet recording apparatus decreases occurs.

In general, images produced by pigment inks have relatively low brightness and chromaticness compared to images produced by dye inks, i.e., images produced by pigment inks have inferior to images produced by dye inks in color reproducibility. In particular, with respect to brightness and chromaticness of secondary color images, pigment inks are seriously inferior to dye inks. In attempting to solve this problem, WO99/05230 discloses a technique using Y, M, C, K, G and Or (orange) pigment inks. However, the color reproducibility of the inks are not satisfactory, and in particular the red color reproducibility is not satisfactory.

JOP 2001-192583 discloses a technique in that a combination of a specific dispersant and a specific additive is used to efficiently prepare an ink including a pigment having a small particle diameter in a short period of time. However, the average particle diameter of the pigment in the ink is on the order of 100 to 200 nm. In order to impart good discharging stability to an inkjet ink and to produce images having good chromaticness (i.e., clearness), the pigment in the ink has to have a particle diameter of from 10 to 50 nm. An ink in which such a fine pigment is dispersed cannot be produced by any conventional techniques.

As mentioned above, there is a limit to the particle diameter of pigment particles included in inks prepared by pulverization/dispersion methods. In addition, the particle diameter means an average particle diameter, and therefore large pigment particles are also included therein. When such large pigment particles are included at a high content, the ink tends to cause a clogging problem and therefore it is not preferable. In addition, even when pigment particles are finely pulverized, the pulverized pigment particles have new cleaved surfaces due to the pulverization operation, and thereby the surface area of the pigment particles is increased while the surface of the pigment particles is activated. Therefore, a problems such that the pigment agglomerates when the ink is preserved occurs, i.e., the ink has poor preservability.

Because of these reasons, a need exists for a pigment inkjet ink which has good discharging stability and preservability and which can produce good images having good chromaticness (good clearness).

SUMMARY OF THE INVENTION

Accordingly, an object of the present invention is to provide a pigment inkjet ink which has good discharging stability and preservability and which can produce images with good chromaticness (good clearness), uniform image density and little diffuse reflection.

Another object of the present invention is to provide an ink cartridge, an inkjet recording method and an inkjet recording apparatus, by which images with good chromaticness (good clearness), uniform image density and little diffuse reflection can be produced.

Yet another object of the present invention is to provide an inkjet image with good chromaticness (good clearness), uniform image density and little diffuse reflection.

Briefly these objects and other objects of the present invention as hereinafter will become more readily apparent can be attained by an inkjet ink including at least water, a particulate pigment, a dispersant and an emulsion, wherein the particulate pigment has an average particle diameter (D50) not greater than 100 nm, and the standard deviation of particle diameter distribution of the particulate pigment is less than one half of the average particle diameter (D50).

The content of the emulsion in the inkjet ink is preferably from 1% by weight to 20% by weight. The emulsion is preferably a polyurethane emulsion, or a silicone oil emulsion which preferably has a particle diameter greater than the average particle diameter of the particulate pigment.

The content of the dispersant is from 0.3 to 2 parts by weight per 1 part by weight of the particulate pigment.

The dispersant preferably includes a compound having the following formula (1):

(1)

wherein n is an integer of from 20 to 100, and n is preferably 40 (i.e., polyoxyethylene (n=40) β-naphthyl ether is preferable).

The pigment is preferably a self-dispersion pigment or a microencapsulated pigment.

The pigment is preferably selected from the group consisting of carbon black; Pigment Red 5, 7, 12, 48 (Ca), 48 (Mn), 57 (Ca), 57:1, 112, 122, 123, 146, 168, 176, 184, 185 and 202, and Pigment Violet 19; Pigment Blue 1, 2, 3, 15, 15:3, 15:4, 16, 22, 60, 63 and 66; Pigment Yellow 1, 2, 3, 12, 13, 14, 16, 17, 73, 74, 75, 83, 93, 95, 97, 98, 114, 120, 128, 129, 138, 150, 151, 154, 155, 174 and 180.

In another aspect of the present invention, an inkjet ink cartridge is provided which includes a container and the above-mentioned inkjet ink contained therein. The ink cartridge preferably may have a recording head having a nozzle from which the ink is discharged.

In yet another aspect of the present invention, an inkjet recording apparatus is provided which includes the ink cartridge of the present invention, which includes the ink of the present invention and a carriage configured to carry the ink cartridge to form an ink image on a recording paper.

In a further aspect of the present invention, an inkjet recording method is disclosed which includes the step of discharging an ink from a nozzle of a recording head to form an ink image of a recording paper, wherein the ink is the inkjet ink of the present invention.

In a still further aspect of the present invention, an image is provided which is recorded on a recording material by the inkjet recording method of the present invention. The recording material is preferably a paper.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

The inkjet ink of the present invention includes at least water, a water soluble organic solvent, a particulate pigment, a dispersant and an emulsion, wherein the particulate pigment has an average particle diameter (D50) not greater than 100 nm, and the standard deviation of particle diameter distribution of the particulate pigment is not greater than ½ of the average particle diameter (D50).

The reason why the average particle diameter (D50) is preferably not greater than 100 nm, and the standard deviation of particle diameter distribution is not greater than ½ of the average particle diameter is considered to be as follows. Since all the pigment particles have particle diameters near a specific particle diameter with small standard deviation, the pigment particles in an image area hardly cause diffuse reflection, and thereby the image has uniform image density. In other words, when the average particle diameter (D50) is greater than 100 nm, and the standard deviation of particle diameter distribution is greater than ½ of the average particle diameter (D50), the pigment particles in an image area cause diffuse reflection, and thereby the resultant image has non-uniform image density and the clearness of the image deteriorates.

By including an emulsion in the inkjet ink, diffuse reflection of the resultant images can be avoided, and thereby the images have uniform image density.

In the present invention, the emulsion means emulsions in which water forms a continuous phase, and the following materials form a dispersion phase.

Specific examples of the materials forming the dispersion phase of the emulsion for use in the inkjet ink of the present invention include resins such as acrylic resins, vinyl acetate resins, styrene-butadiene resins, vinyl chloride resins, acrylic-styrene resins, butadiene resins, styrene resins, crosslinked acrylic resins, crosslinked styrene resins, benzoguanamine resins, phenolic resins, silicone resins, epoxy resins, urethane resins, paraffin waxes, fluorine-containing resins, etc.

Among these materials, urethane resins are preferably used because the resultant inkjet ink has good dispersion stability and the resultant images have good clearness.

In the present invention, the emulsion has an O/W form before and after the emulsion is mixed with other inkjet ink constituents to prepare the inkjet ink.

Specific examples of the polyurethane emulsions include emulsions which are prepared by emulsifying a popular polyurethane resin having relatively good affinity for water using an emulsifier, and self-emulsifying emulsions which are prepared by emulsifying a polyurethane resin in which a functional group serving as an emulsifier is incorporated by a method such as copolymerizing.

Both of these types of polyurethane emulsions can be used in the present invention. However, one or more proper emulsions are selected while considering matching of the emulsions with the other ink constituents to obtain an ink having good dispersion stability.

Among these polyurethane emulsions, anionic self-emulsifying polyurethane resin emulsions are preferably used because the resultant inkjet inks have good dispersion stability even when the emulsions are combined with various pigments and dispersants.

The polyurethane resin emulsions for use in the inkjet ink of the present invention preferably have an average particle diameter not greater than 50 nm, and preferably not greater than 40 nm. When the average particle diameter is too large, the resultant images have low transparency and poor clearness. In addition, the images cause diffuse reflection, resulting in deterioration of clearness of the images.

In order to impart good fixability and dispersion stability to the resultant inkjet ink, polycarbonate type polyurethane resin emulsions are more preferably used than polyester type polyurethane resin emulsions.

The polyurethane resins included in the emulsions for use in the inkjet ink of the present invention preferably have a glass transition temperature of from 0° C. to −50° C., and more preferably from −10° C. to −40° C. to impart good abrasion resistance to the resultant images. The reason why such glass transition temperature range is preferable is not yet determined, but is considered to be as follows. When a polyurethane resin having a glass transition temperature not higher than 0° C., the film of the resin is hard like glass, and the pigment particles and the polyurethane resin are adhered to a recording material at the same time (i.e., it seems that the resultant image consists of areas of the particles and areas of the resin), and therefore the image has a relatively low abrasion resistance. In contrast, polyurethane resins having a glass transition temperature not higher than 0° C. are soft like a rubber, and thereby the resin spreads on the entire image area while covering the pigment, resulting in improvement of the abrasion resistance. It is found that when various polyurethane resins are evaluated at the same content, inks including a polyurethane resin having a glass transition temperature from 0° C. to −50° C. can produce images having better abrasion resistance.

The glass transition temperature is determined using a differential scanning calorimeter (DSC) or a thermomechanical analyzer (TMA).

The polyurethane resin in the emulsion for use in the inkjet ink of the present invention preferably has an average particle diameter not greater than 50 nm. When the average particle diameter is too large, a clogging problem in that the ink is not discharged from nozzles because the nozzles are clogged with large emulsion particles. In this case, printing becomes possible if the ink passage including nozzles is cleaned, but such measure is not practical, namely, such an ink is not practical.

The polyurethane resin emulsions for use in the inkjet ink of the present invention preferably has a minimum film forming temperature (MFT) not higher than room temperature, and more preferably not higher than 25° C. When the polyurethane resin emulsion has a MFT not higher than room temperature, the resultant images have good fixability because the resin can bind the pigment to fibers of recording paper without performing any heating or drying treatment.

The MFT of an aqueous emulsion is determined by the following method:
(1) the aqueous emulsion is spread on a plate of a metal such as aluminum;
(2) the spread emulsion is naturally dried while the environmental temperature is kept constant;
(3) the film is visually observed whether the film is transparent (i.e., a continuous layer) or opaque (i.e., a discontinuous layer); and
(4) the procedures of (1) to (4) are repeated while the environmental temperature is changed to determine a minimum temperature above which transparent film can be formed.

At this point, the term "film forming" means that when an aqueous polymer emulsion in which a particulate polymer is dispersed in water is coated on a plate, and then water forming a continuous phase is evaporated, a film of the polymer is formed. This polymer film can strongly bind the pigment in the inkjet ink to the surface of recording materials, resulting in formation of images having good abrasion resistance and water resistance.

The content of the polyurethane resin (i.e., emulsified particles) in the inkjet ink is preferably from 0.1% by weight to 20% by weight, and more preferably from 1.0% by weight to 10% by weight, based on the total weight of the inkjet ink.

When the content of the emulsified particles is too low, the pigment in the ink is insufficiently covered with the emulsified particles, and thereby good abrasion resistance cannot be imparted to the resultant images. In contrast, when the content is too high, the resultant inkjet ink has too high a viscosity, and thereby it becomes impossible to discharge the ink from nozzles of inkjet recording heads.

In addition, by including a silicone oil emulsion in the inkjet ink of the present invention, pigment dispersion of the inkjet ink can be improved (i.e., agglomeration of dispersed pigment particles can be prevented) without increase of the viscosity of the ink and agglomeration of the dispersed materials. Therefore, the resultant images have good clearness.

The action of the silicone oil emulsion in the ink is not known but is considered to be as follows. Since silicone emulsions have a small surface tension, i.e., a small surface energy, the silicone oil spreads on the surface of pigment particles to be dispersed and the newly formed surface of pulverized pigment particles, resulting in formation of a thin layer of the silicone oil on the surface of the pigment particles. Thereby the surface energy of the pigment particles is decreased. In addition, the silicone oil is present as drops in the inkjet ink while hardly mixing with water and water-soluble solvents and being hardly adsorbed on the surface of the pigment particles. When such an inkjet ink is discharged and adhered to a recording material, the silicone oil spreads on the pigment particles, and thereby diffuse reflection of the resultant images can be avoided.

The content of the silicone oil emulsion in the inkjet ink of the present invention is from 1 to 20% by weight, and more preferably from 5 to 10% by weight based on total weight of the inkjet ink. When the content is too low, the diffuse reflection preventing effect is insufficient. In contrast, when the content is too high, the resultant inkjet ink has too high a viscosity to be used for inkjet recording.

The weight ratio (S/P) of the silicone oil emulsion (S) to the pigment (P) in the inkjet ink of the present invention is preferably from 0.1/1 to 20/1, and more preferably from 1/1 to 10/1. In addition, adding a silicone oil increases gloss of recorded images. From this point of view, the weight ratio (S/P) is preferably from 0.1/1 to 10/1. When the weight ratio falls in this range, the surface of the pigment can be uniformly covered with the silicone oil. Therefore, the weight ratio (S/P) is preferably 1/1 to 10/1 when taking these points into consideration.

In the inkjet ink of the present invention, the average particle diameter of the silicone oil emulsion is preferably larger than that of the pigment included in the ink. In this case, the pigment can be covered with the silicone oil emulsion, and thereby the diffuse reflection preventing effect and gloss increasing effect of the silicone oil emulsion can be fully produced.

The average particle diameter (D50) of the silicone oil emulsion is preferably not less than 100 nm, and more preferably not less than 200 nm. When the average particle diameter is too small, the pigment in an image cannot be fully covered with the silicone oil, and thereby the image causes diffuse reflection, resulting in formation of an image having non-uniform image density.

In the inkjet ink of the present invention, the average particle diameter (D50) of the pigment therein is not greater than 100 nm and preferably not greater than 50 nm, and the standard deviation of particle diameter distribution of the pigment particles is ½, and preferably not greater than ¼, of the average particle diameter (D50) of the pigment to prevent the resultant images from causing diffuse reflection.

The average particle diameter (D50) and the standard deviation of the particle diameter distribution can be determined by particle diameter analyzer UPA 150 manufactured by Nikkiso Co., Ltd. In this case, the standard deviation of particle diameter distribution is output as "sd".

Specific examples of the black pigments for use as the pigment of the inkjet ink of the present invention include carbon blacks such as furnace black and channel black.

Specific examples of the yellow pigments include Pigment Yellows 1, 2, 3, 12, 13, 14, 16, 17, 73, 74, 75, 83, 93, 95, 97, 98, 114, 120, 128, 129, 138, 150, 151, 154, 155, 174, 180, etc.

Specific examples of the magenta pigments include Pigment Reds 5, 7, 12, 48 (Ca), 48 (Mn), 57 (Ca), 57:1, 112, 122, 123, 168, 176, 184, 185, 202, etc.; Pigment Violet 19; etc.

Specific examples of the cyan pigments include Pigment Blue 1, 2, 3, 15, 15:3, 15:4, 16, 22, 60, 63 and 66; Vat Blue 4 and 60; etc.

Among these pigments, Pigment Yellow 138, Pigment Red 122 and Pigment Blues 15 are preferably used as a yellow color pigment, a magenta color pigment and a cyan color pigment, respectively, because of having good color reproducibility and light resistance.

The content of the pigment in the inkjet ink of the present invention is preferably from 1 to 20% by weight, and more preferably from 5 to 10% by weight, based on total weight of the inkjet ink. When the content is too low, the resultant images have low image density. In contrast, when the content is too high, the resultant inkjet ink has too high a viscosity to be used for inkjet recording.

The inkjet ink of the present invention includes a dispersant. The content of the dispersant in the inkjet ink is preferably from 0.3 to 2 parts by weight, and more preferably from 0.5 to 2 parts by weight, per 1 part by weight of the pigment included in the inkjet ink. When the content falls in this range, it becomes easy to prepare an inkjet ink in which the dispersed pigment has a small average particle diameter and a small standard deviation in particle diameter distribution. In addition, by adding a dispersant in such an amount, good surface activating effect can be produced, and thereby images having good clearness can be produced.

When the content of the dispersant is too low, the average particle diameter of the pigment in the inkjet ink becomes large, and thereby the resultant images have poor clearness. In contrast, when the content is too high, the resultant inkjet ink has too high a viscosity to be used for inkjet recording.

Any known dispersants can be used for the inkjet ink of the present invention, but dispersants having the following formula (1) are preferably used because of producing an inkjet ink in which the dispersed pigment has a small average particle diameter and a small standard deviation in particle diameter distribution.

(1)

wherein n is an integer of from 20 to 100.

In the dispersants having formula (1), n is an integer of from 20 to 100, and preferably from 30 to 50. When n is too small, the resultant inkjet ink has poor dispersion stability, resulting in increase of the average particle diameter of the dispersed pigment, and thereby the resultant images have poor clearness. In contrast, when n is too large, the resultant inkjet ink has too a high viscosity to be used for inkjet recording. Among these dispersants, polyoxyethylene (n=40) β-naphthyl ether is more preferable.

The inkjet ink of the present invention preferably includes a water-soluble organic solvent so as to have good water-holding capacity and wettability. By adding a water-soluble organic solvent in the inkjet ink, the inkjet ink hardly causes problems such that the dispersed pigment agglomerates, and the viscosity of the ink increases, when the ink is preserved for a long period of time. Namely, the inkjet ink has good preservability. In addition, the clogging problem in that the nozzles from which the ink is discharged are clogged with large pigment particles and/or a dried ink can be avoided. This is because the ink located at the tip edges of the nozzles has a fluidity even when being allowed to settle for a long period of time at the tip edges without being covered with a cap, etc. Namely, the inkjet ink has good discharging property.

Specific examples of such water soluble organic solvents for use in the inkjet ink include polyhydric alcohols such as ethylene glycol, diethylene glycol, triethylene glycol, polyethylene glycol, polypropylene glycol, 1,5-pentanediol, 1,6-hexanediol, glycerin, 1,2,6-hexanetriol, 2-ethyl-1,3-hexanediol, ethyl-1,2,4-butanetriol, 1,2,3-butanetriol, and petriol; alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers of polyhydric alcohols such as ethylene glycol monophenyl ether, and ethylene glycol monobenzyl ether; nitrogen-containing alicyclic compounds such as 2-pyrrolidone, N-methyl-2-pyrrolidone, N-hydroxyethyl-2-pyrrolidone, 2-pyrrolidone, 1,3-dimethylimidazolidinone, and ε-caprolactam and γ-butyrolactone; amides such as formamide, N-methylformamide, and N,N-dimethylformamide; amines such as monoethanol amine, diethanol amine, triethanol amine, monoethyl amine, diethyl amine and triethyl amine; sulfur-containing compounds such as dimethyl sulfoxide, sulforane, and thiodiethanol; propylene carbonate, ethylene carbonate, etc.

These water-soluble organic solvents can be used alone or in combination.

Among these organic solvents, diethylene glycol, thiodiethanol and glycerin are preferably used. By using such organic solvents, occurrence of the clogging problem due to evaporation of water in the ink can be prevented and the stability of the ink composition can be improved. In addition, the clearness of the images can be improved.

The inkjet ink of the present invention preferably has a surface tension of from 20 mN/m to 50 mN/m, and more preferably from 25 mN/m to 45 mN/m. When the surface tension of the inkjet ink is too low or too high, the wetting property and penetrating property of the inkjet ink against recording papers deteriorate, and in addition the resultant images have poor clearness.

The surface tension can be measured by an instrument, KRUSS K-10ST from KRUSS GMBH, under an environmental condition of 23° C. and 55% RH.

The inkjet ink of the present invention preferably has a viscosity not greater than 10 mPa.s. The viscosity is too high, a problem in that images cannot be printed occurs. The viscosity can be measured by an instrument, RE-80L from Toki Sangyo Co., Ltd., under an environmental condition of 23° C. and 55% RH.

The pH of the inkjet ink of the present invention is preferably from 7 to 10. A pH buffer is preferably included in the inkjet ink to control the pH so as to fall in the above-mentioned range.

Specific examples of the pH buffer include aminoethane sulfonic acid, 2-aminoethane sulfonic acid, esters of 2-aminoethyl sulfonic acid, N-acetyl-L-cysteine, catechol, pyrogallol, o-phenolsulfonic acid, phloroglucinol, resorcinol, asparagine, arginine, L-allothreonine, ornithine, hydrochloric acid salt of ornithine, glutathione (reduced form), oxidized glutathione, glutamine, cystine, cysteine, 3,4-hydroxyphenyl alanine, citrulline, L-serine, DL-serine, tyrosine, tryptophan, L-threonine, DL-threonine, histidine, phenyl alanine, homocysteine, DL-methionine, L-methionine, lycine, hydrochloric acid salt of lycine, 4-aminopyridine, pyridoxal, hydrochloric acid salt of pyridoxine, morpholine, inosine, uracil, guanine, guanosine, hypoxanthine, purine, N,N-bis(2-hydroxyethyl)-2-aminoethanesulfonic acid, 3-morpholinopropanesulfonic acid, [N-tris(hydroxymethyl) methyl-2-amino]ethanesulfonic acid, N-2-hydroxyethylpiperazine-N'-2-ethanesulfonic acid, piperazine-N-N'-bis(2-hydroxypropane)-3-sulfonic aid, 3-[N-(trishydroxymethyl) methylamino]-2-hydroxypropanesulfonic acid, 3-[N,N-bis (2-hydroxyethyl)amino]-2-hydroxypropanesulfonic acid, N-2'-hydroxyethylpiperazine-N-2-hydroxypropane-3-sulfonic acid, N-2-hydroxyethylpiperazine-N'-2-ethanesulfonic acid, tris(hydroxyethyl)aminomethane, N-[tris(hydroxymethyl)methyl]glycine, glycylglycine, N,N-di(2-hydroxyethyl)glycine, N-[tris(hydroxymethyl)methyl]-3-aminopropanesulfonic acid, diethanolamine, ethanolamine, 2-amino-2-methyl-1,3-propanediol, 2-amino-2-ethyl-1,3-propanediol-3-[(1,1-dimethyl-2-hydroxyethyl)amino]-2-hydroxypropanesulfonic acid, 2-cyclohexylaminoethanesulfonic acid, N-cyclohexyl-2-hydroxy-3-aminopropanesulfonic acid, 3-cyclohexylaminopropanesulfonic acid, etc.

Among these compounds, 3-[(1,1-dimethyl-2-hydroxyethyl)amino]-2-hydroxypropanesulfonic acid, 2-cyclohexylaminoethanesulfonic acid, N-cyclohexyl-2-hydroxy-3-aminopropanesulfonic acid, and 3-cyclohexylaminopropanesulfonic acid are preferable.

The content of the pH buffers in the inkjet ink of the present invention is from 0.001 to 10% by weight, more preferably from 0.005 to 5% by weight, and even more preferably from 0.05 to 2% by weight, based on the total weight of the inkjet ink. When the content is too low, the pH controlling effect cannot be fully produced. In contrast, when the content is too high, the resultant inkjet ink has high viscosity. It is preferable to add a pH buffer in the pigment dispersion preparation process rather than in the ink preparation process in which the pigment dispersion prepared in the pigment dispersion process is mixed with additives, to control the pH of the resultant ink in a narrow pH range even at a small content.

The inkjet ink of the present invention can include surfactants such as nonionic surfactants, anionic surfactants, cationic surfactants and amphoteric surfactants; antiseptics; etc.

Specific examples of the nonionic surfactants include polyoxyethylene alkylphenyl ethers, polyoxyethylene alkyl ethers, esters of fatty acids with polyoxyethylene, esters of fatty acids with sorbitan, esters of fatty acids with polyoxyethylenesorbitan, esters of fatty acids with polyoxyethyleneglycerin, esters of fatty acids with polyglycerin, esters of fatty acids with polyoxyethylenesorbit, polyoxyethylene sterol, polyoxyethylenepolyoxypropylene alkyl ethers, polyoxyethylene fatty acids amides, polyoxyethylene-polyoxypropylene block copolymers, tetramethyldecynediol, adducts of tetramethyldecynediol with ethylene oxide, etc.

Specific examples of the anionic surfactants include alkylbenzene sulfonates, alkylphenyl sulfonates, alkylnaphthalene sulfonates, higher fatty acid salts, sulfates of higher fatty acid esters, sulfonates of higher fatty acid esters, sulfates of higher alcohol ethers, sulfonates of higher alcohol ethers, salts of higher alkylsulfosuccinic acid, condensation products of naphthalenesulfonates with formalin, salts of polystyrene sulfonic acids, salts of polyacrylic acid, salts of polyoxyalkylene alkyl ether phosphoric acids, salts of polyoxyalkylene alkyl ether carboxylic acids, salts of alkylsulfuric acids, acrylic acid-acrylate copolymers, etc.

In addition, silicone-based surfactants such as adducts of polysiloxane with polyoxyethylene; fluorine-containing surfactants such as perfluoroalkyl carboxylates, perfluoroalkyl sulfonates, and oxyethylene perfluoroalkyl ethers; and bio surfactants such as spiculisporic acid, rhamnolipid, and lysolecithin, can also be used.

The content of the surfactant in the inkjet ink of the present invention is preferably from 0.1 to 5.0% by weight, and more preferably from 0.5 to 3.0% by weight, based on the total weight of the inkjet ink.

The pigment dispersion for use in the inkjet ink of the present invention can be prepared by mixing a pigment, a dispersant and water, optionally together with additives such as water-soluble organic solvents, and dispersing the mixture using a known dispersing machine such as sand mills, ball mills, roll mills, bead mills, NANOMIZER, and HOMOGENIZER (i.e., subjecting the mixture to a wet dispersion treatment). In this case, it is preferable that the addition amount of the dispersant is from 0.3 to 2 parts by weight per 1 part by weight of the pigment included therein.

The inkjet ink of the present invention preferably includes a fluorine-containing surfactant. Suitable fluorine-containing surfactants include sodium salts of fluoroalkylbenzene sulfonic acids, fluoroalkylphosphonic acid, sodium salts of fluoroalkylcarboxylic acids, fluoroalkyl polyoxyethylene ethers, fluoroalkyl ammonium iodide, fluoroalkyl betaine, etc. Among these fluorine-containing surfactants, anionic fluorine-containing surfactants such as fluoroalkylbenzene sulfonic acid sodium salts, which is highly soluble in water, are especially preferable.

The addition amount of such fluorine-containing surfactants is from 0.1 to 5.0% by weight, and more preferably from 0.5 to 3.0% % by weight, based on the total weight of the ink.

The thus prepared pigment dispersion is preferably used for the pigment-based inkjet ink of the present invention.

The pigment-based inkjet ink of the present invention can be typically prepared by the following method:
(1) the pigment dispersion prepared above, and other additives such as water, water-soluble organic solvents, and surfactants are mixed while agitating;
(2) the mixture is subjected to a filtering treatment, a centrifugal treatment or the like treatment to remove coarse particles therefrom; and
(3) then the mixture is deaerated.

The pigment content of the inkjet ink is preferably from 1 to 7% by weight. When the pigment content is too low, the resultant print images have poor clearness because of having low image density. In contrast, when the pigment content is too high, the viscosity of the resultant inkjet ink seriously increases and thereby the inkjet ink tends to cause the clogging problem.

When the inkjet ink is prepared, the additives mentioned above for use in the pigment dispersion can be optionally added. For example, a water-soluble organic solvent can be added in an amount of from 0 to 50% by weight, preferably from 5 to 40% by weight, and even more preferably from 10 to 30% by weight, based on total weight of the ink.

The thus prepared pigment-based inkjet ink can be preferably used for an ink cartridge which typically includes plural color inks each having a different color tone and which is used for forming full color images.

The ink cartridge of the present invention can be used for an inkjet printer which discharges one or more inks toward a recording material such as papers to record an image on the recording material.

The inkjet ink of the present invention can be used for continuously-projecting type inkjet recording methods (apparatus) and on-demand type inkjet recording methods (apparatus). The on-demand type inkjet recording methods include piezoelectric inkjet recording methods, thermal inkjet recording methods and electrostatic inkjet recording methods.

An embodiment of the inkjet recording apparatus of the present invention will be explained referring to FIG. 1.

Figure 1:
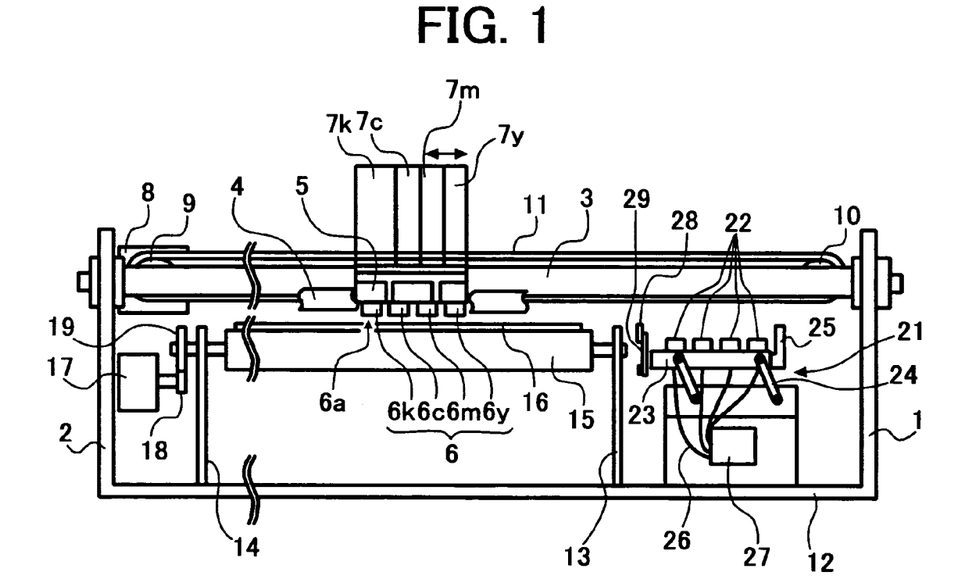
FIG. 1 is a schematic view illustrating an embodiment (a serial printer) of the inkjet recording apparatus of the present invention.

FIG. 1 is a schematic view illustrating the working part of an embodiment of the inkjet recording apparatus of the present invention, which is a serial inkjet recording apparatus and has an ink cartridge having an ink container containing the inkjet ink of the present invention.

In the inkjet recording apparatus as shown in FIG. 1, a main support/guide rod 3 (hereinafter a main guide rod 3) and a trailing support/guide rod 4 (hereinafter a trailing guide rod 4) are supported by side plates 1 and 2 such that the main guide rod 3 and trailing guide rod 4 are set substantially horizontally. A carriage unit 5 slides in a main scanning direction (i.e., in a direction indicated by a double-head arrow) while being supported by the main guide rod 3 and trailing guide rod 4. The carriage unit 5 has four heads 6, i.e., a yellow ink head 6$y$, a magenta ink head 6$m$, a cyan ink head 6$c$ and a black ink head 6$k$, each of which discharges a yellow ink, a magenta ink, a cyan ink and a black ink, respectively. An ink discharging surface 6$a$ (i.e., a surface having nozzles) faces downward. In the upper part of the carriage unit 5, four ink cartridges 7$y$, 7$m$, 7$c$ and 7$k$ which respectively supply the yellow, magenta, cyan or black inks to the respective heads 6$y$, 6$m$, 6$c$ and 6$k$, are exchangeably set.

The carriage unit 5 is connected with a timing belt 11 which is rotated by a drive pulley 9 (i.e., a drive timing pulley), which is driven by a main scanning motor 8, and a driven pulley 10 (i.e., an idle pulley) while stretched. By driving the main scanning motor 8, the carriage 5 (i.e., four recording heads 6) slides in the main scanning direction.

Sub-flames 13 and 14 stand on a bottom plate 12 connected with the side plates 1 and 2. The sub-flames 13 and 14 rotatably support a feeding roller 15 which feeds a recording material 16 in a sub-scanning direction perpendicular to the main scanning direction. A sub-scanning motor 17 is arranged outside of the sub-flame 14. A gear 18 which is fixed on a rotation axis of the sub-scanning motor 17 is engaged with a gear 19 fixed on an axis of the feeding roller 15 to transmit the rotation of the sub-scanning motor 17 to the feeding roller 15.

At a location between the side plate 1 and sub-flame 13, a reliability maintaining mechanism 21 (hereinafter referred to as a sub-system 21) configured to maintain the reliability of the head 6 is provided. The sub-system 21 has four caps 22 which cap the four ink discharging surfaces 6$a$ and which are supported by a holder 23. The holder 23 is slidably supported by a link member 24. When the carriage unit 5 moving toward the side plate 1 contacts a plate 25 engaged with the holder 23, the holder 23 is lifted up due to the movement of the carriage unit 5, and thereby the discharging surfaces 6$a$ of the inkjet head 6 are capped with the caps 22. When the carriage unit 5 located on the caps 22 moves toward the side plate 2, the holder 23 is lowered due to the movement of the carriage unit 5, resulting in separation of the discharge surfaces 6$a$ of the inkjet head 6 from the caps 22.

The caps 22 are connected with a suction pump 27 via a suction tube 26. In addition, the caps 22 have air openings which lead to air through a tube and a valve. In addition, the ink (waste ink) collected by the suction pump 27 is discharged to a waste ink tank (not shown) via a drain tube.

At a location outside the holder 23, a wiper blade 28 configured to wipe the discharging surfaces 6a of the inkjet head 6 and made of a material such as textile, foamed materials, and elastic materials (e.g., rubbers) is provided on a blade arm 29. The blade arm 29 is supported so as to be oscillated by a cam rotated by a driving device (not shown).

Suitable recording materials for use in the inkjet recording apparatus include ink-absorbable materials, such as papers, which absorb the inkjet ink, and ink-unabsorbable materials which do not absorb the inkjet ink.

Specific examples of the recording materials include sheets of plastics such as polyethylene terephthalate, polycarbonate, polypropylene, polyethylene, polysulfone, ABS resins, and polyvinyl chloride resins; metals such as brass, iron, aluminum, stainless steel and copper; materials in which a metal layer is formed on a non-metal material using a method such as deposition; papers subjected to water-repellent finishing; ceramics which are prepared by sintering inorganic materials at a high temperature, etc. Among these materials, papers are more preferable because the cost is relatively low and the images formed thereon look natural.

Figure 2:
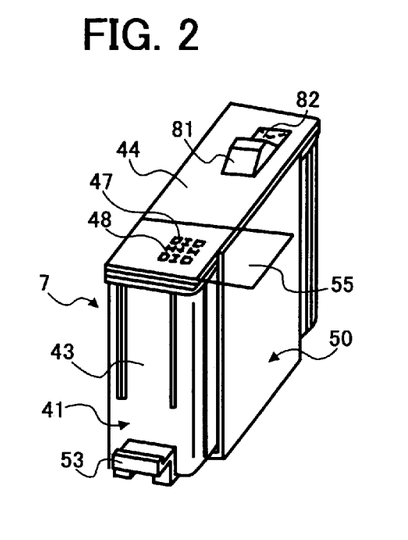
FIG. 2 is a perspective view of an embodiment of the ink cartridge of the present invention.
Figure 3:
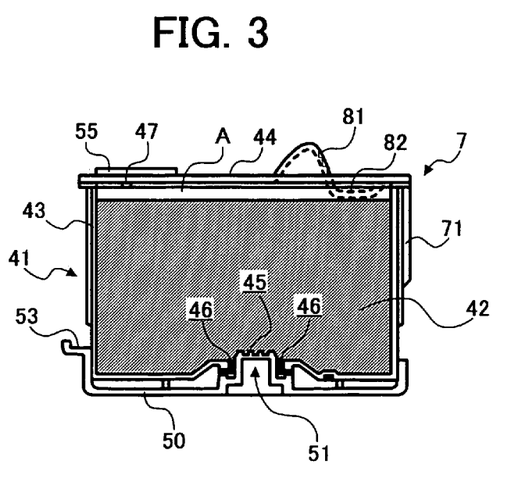
FIG. 3 is a cross sectional view of the embodiment of the ink cartridge of the present invention illustrated in FIG. 2.

FIGS. 2 and 3 are a perspective view and a sectional front elevation of the ink cartridge 7 of the present invention.

As shown in FIGS. 2 and 3, the ink cartridge 7 has a cartridge main body 41 in which an ink absorber 42 is contained. The ink absorber 42 absorbs a color ink (for example, a yellow, a magenta, a cyan or a black ink). The ink is the inkjet ink of the present invention. The cartridge main body 41 has a case 43 having a large opening on an upper part thereof and a top cover 44 which is adhered on the case 43 using an adhesive or by welding. The main body 41 is made of, for example, a resin (a mold of resin). The ink absorber 42 is formed of a porous material such as urethane foams. Such a porous material is contained in the cartridge main body 41 upon application of pressure and then an ink is injected into the porous material such that the porous material absorbs the ink.

At the bottom of the cartridge main body 41, an ink supplying opening 45 is provided to supply the ink to one of the recording heads 6. A seal ring 46 is engaged with the inside periphery of the ink supplying opening 45. In addition, the upper cover 44 has an air opening 47.

The cartridge main body 41 has a cap 50. The cap 50 covers the ink supplying opening 45 to prevent the ink contained therein from leaking from the main body 41 before the cartridge is set in an inkjet recording apparatus. In addition, the cap 50 prevents the ink from leaking from the main body 41 due to deformation of the case 43 caused by the pressure applied to the wide surface of the cartridge when the cartridge is set, handled or wrapped in vacuum.

A film seal 55 having a high oxygen permeability is adhered on the air opening 47 to seal the air opening 47 as illustrated in FIG. 2. The film seal 55 seals not only the air opening 47 but also plural grooves 48 formed in the vicinity of the air opening 47. By sealing the air opening 47 with a film seal 55 having a high oxygen permeability, the ink can be effectively deaerated when the cartridge 7 is wrapped under a reduced pressure even when air is dissolved in the ink when the ink is filled in the cartridge or air present in a space A (as shown in FIG. 3) formed between the ink absorber 42 and the cartridge main body 41 is dissolved in the ink. Namely, when such a sealed ink cartridge is wrapped with a packaging material which hardly transmit air, such as films laminated with aluminum, under a reduced pressure, the air dissolved in the ink can be discharged to the space formed between the cartridge main body 41 and the wrapping material.

Numeral 51 denotes a projection of the cap 50, which is formed to prevent the ink from leaking from the main body 41 of the ink cartridge. Numeral 53 denote a projection. By pressing the projection 53, the cap 50 can be easily disengaged from the main body 41. Numeral 71 denotes a projection by which the color of the ink in the cartridge can be determined. Numerals 81 and 82 denote a projection and a recess by which the cartridge can be easily disengaged from the printer.

Figure 4:
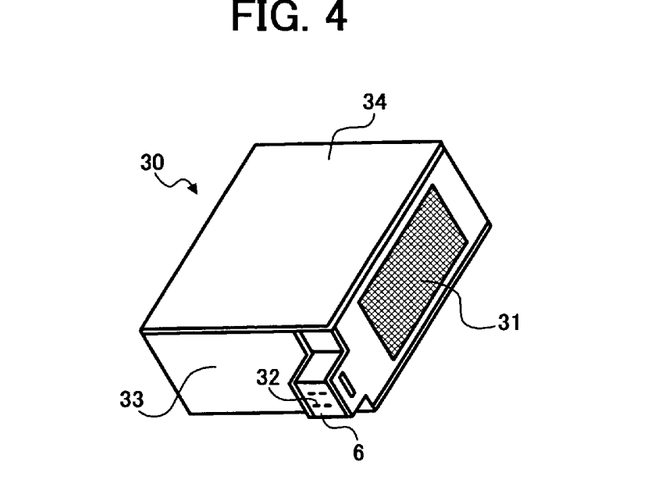
FIG. 4 is a perspective view of an embodiment of the ink cartridge of the present invention, which is integrated with a recording head.

FIG. 4 is a schematic view illustrating the ink cartridge (i.e., a recording unit) having a container containing the inkjet ink of the present invention and a recording head discharging drops of the ink. Then the recording unit will be explained referring to FIG. 4.

A recording unit 30 is used for serial inkjet printers. The recording unit 30 includes, as main elements, a recording head 6, an ink tank 41 containing the recording ink to be supplied to the recording head 6, and a container cover 34 keeping the ink tank 33 airtight. The recording head 6 has plural nozzles 32 to discharge the recording ink. The recording ink is supplied from the ink tank 33 to an ink room (not shown) through an ink supplying tube (not shown). The recording ink in the ink room is discharged from the nozzles 32 according to electric signals input from the main body of the inkjet recording apparatus through an electrode 31. The recording unit of this type is typically used for so-called thermal- or bubble-inkjet recording heads which can be manufactured at a low cost and which utilizes heat energy as the power source for discharging ink drops.

Figure 5:
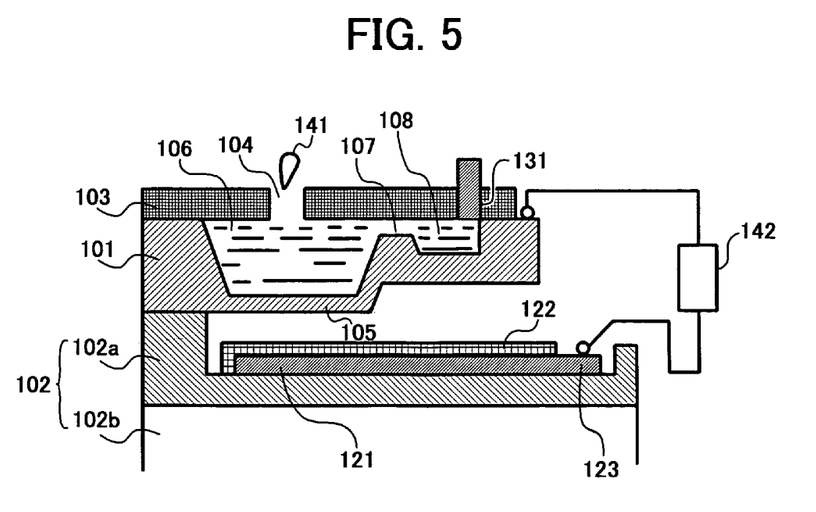
FIG. 5 is a cross section of a recording head for use in the inkjet recording apparatus of the present invention.

The recording head discharging ink drops will be explained referring to FIG. 5. FIG. 5 is a cross sectional side view of an electrostatic inkjet recording head.

The recording head as shown FIG. 5 includes three single-crystal silicon substrates 101, 102 (i.e., 102a and 102b) and 103 which are overlaid while being adhered. The reason why single crystal silicon is used for the recording head is that a thin vibrating plate which has a thickness of about few micrometers and which is used for discharging ink can be easily prepared by an etching method. In addition, the material is advantageous because of being easily connected with a high degree of accuracy using an anode junction method.

In addition, when the vibrating plate is vibrated upon application of electrostatic force, it is needed to apply a voltage to an electrode to generate the electrostatic force. Since silicon is a semiconductor and can be easily processed so as to have a low resistance, the silicon substrate can serve as an electrode of the vibrating plate. Namely, silicon is advantageously used because an additional electrode need not to be formed on the vibrating plate side.

The intermediate substrate, i.e., the first substrate 101, has a first recessed portion forming an ink room 106 and having a bottom wall serving as a vibrating plate 105, a projection which is formed at the rear of the recessed portion and which forms an ink-flow-regulating portion 107 and a second recessed portion which forms an ink cavity 108 which commonly supplies the ink to the plural ink rooms 106.

The second substrate 102 which is adhered with the lower surface of the first substrate 101 is constituted of a single-crystal silicon substrate 102b and a silicon oxide layer 102a formed on the silicon substrate 102b. On the silicon oxide layer 102a, an electrode 121 which has a form similar to that of the vibrating plate 105 is formed. The electrode 121 has an electrode terminal portion 123. The electrode 121 is covered with an insulating layer 122 except for the terminal portion 123. The second substrate 102 can also be made of PYREX glass, etc.

The third substrate 103 which is adhered with the upper surface of the first substrate 101 has a nozzle 104. The third substrate 103 and first substrate 101 form the ink room 106, the ink-flow-regulating portion 107 and the ink cavity 108. The third substrate 103 also has an ink supplying opening 131 through which the ink is supplied to the ink cavity 108. The ink supplying opening 131 is connected with the ink cartridge (not shown) through a connecting pipe and a tube (not shown). The third substrate 103 can also be made of a material such as glass, nickel, plastics, stainless steel, etc.

When a positive pulse voltage is applied to the electrode 121 by an oscillating circuit 142 in the thus constructed inkjet recording head utilizing an electrostatic force, the surface of the electrode 121 is charged so as to have a positive potential and the vibrating plate 105 facing the electrode 121 is charged so as to have a negative potential, and thereby the vibrating plate 105 bends downward due to electrostatic attraction force.

When application of the pulse voltage to the electrode 121 is stopped, the bent vibrating plate 105 is returned to the former position, resulting in rapid increase of the pressure in the ink room 106, and thereby an ink drop 141 is discharged from the nozzle 104 toward a receiving material (not shown) Then the vibrating plate 105 is again bent downward, and thereby the ink in the ink cavity 108 is supplied to the ink room 106 through the ink-flow-regulating portion 107. As the oscillating circuit 142, circuits which put on/off a pulse voltage or alternators can be used. When images are formed, electric pulses are applied to the electrode 121 according to image signals, to imagewise discharge ink drops from the nozzles 104.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

The following components were mixed to prepare a pigment dispersion (A) for use in a pigment-based inkjet ink.

| Formula of pigment dispersion (A) | |
|---|---|
| Pigment Red 122 | 150 |
| (FASTOGEN SUPER MAGENTA RG from Dainippon Ink And Chemicals, Inc.) | |
| Dispersant having formula (1) | 110 |
| (from Takemoto Oil & Fats Co., Ltd., n = 40) | |
| Wetting agent | 2 |
| (polyoxyethylene (n = 7) sec-alkyl (C12–14) ether, PIONIN D-1107S from Takemoto Oil & Fats Co., Ltd.) | |
| Acrylic resin emulsion | 10 |
| (AG-4000 from Asahi Glass Co., Ltd., average particle diameter of 102 nm) | |
| Distilled water | 738 |

The following components were mixed.

| Formula of inkjet ink (a) | |
|---|---|
| Pigment dispersion (A) prepared above | 40.0 |
| (pigment content of 15% by weight) | |
| Glycerin | 7.5 |
| Diethylene glycol | 22.5 |
| 2-ethyl-1,3-hexanediol | 3.0 |
| 2-pyrolidone | 3.0 |
| Sodium salt of polyoxyethylene (n = 3) alkyl (C13) ether acetic acid | 0.45 |
| Distilled water | 73.55 |

The mixture was agitated for 30 minutes and then subjected to filtering using a Membrane filter having openings with diameter of 0.8 μm, followed by vacuum deaeration. Thus, an inkjet ink (a) was prepared.

Example 2

The procedure for preparation of the inkjet ink in Example 1 was repeated except that the acrylic emulsion AG-4000 used for preparing the pigment dispersion (A) was replaced with a urethane resin emulsion SF-150, which is manufactured by Dai-ichi Kogyo Seiyaku Co., Ltd. and which has an average particle diameter of 87 μm.

Thus, an inkjet ink (b) was prepared.

Example 3

The procedure for preparation of the inkjet ink in Example 1 was repeated except that the acrylic emulsion AG-4000 used for preparing the pigment dispersion (A) was replaced with a urethane resin emulsion SF-126, which is manufactured by Dai-ichi Kogyo Seiyaku Co., Ltd. and which has an average particle diameter of 12 μm.

Thus, an inkjet ink (c) was prepared.

Example 4

The procedure for preparation of the inkjet ink in Example 1 was repeated except that the acrylic emulsion AG-4000 used for preparing the pigment dispersion (A) was replaced with a silicone oil emulsion FZ-4157, which is manufactured by Nippon Unicar Co., Ltd. and which has an average particle diameter of 300 μm.

Thus, an inkjet ink (d) was prepared.

Example 5

The procedure for preparation of the inkjet ink in Example 1 was repeated except that the acrylic emulsion AG-4000 used for preparing the pigment dispersion (A) was replaced with a silicone oil emulsion SAG-30, which is manufactured by Nippon Unicar Co., Ltd. and which has an average particle diameter of 225 μm.

Thus, an inkjet ink (e) was prepared.

Example 6

The procedure for preparation of the inkjet ink in Example 1 was repeated except that the acrylic emulsion AG-4000 used for preparing the pigment dispersion (A) was replaced with a silicone resin emulsion FZ-4188, which is manufactured by Nippon Unicar Co., Ltd. and which has an average particle diameter of 85 μm.

Thus, an inkjet ink (f) was prepared.

Comparative Example 1

The procedure for preparation of the inkjet ink in Example 1 was repeated except that the acrylic emulsion AG-4000 was not added when preparing the pigment dispersion (A).

Thus, an inkjet ink (g) was prepared.

The thus prepared inkjet inks (a) to (g) were evaluated as follows.

1. Particle Diameter (D50) and Standard Deviation (sd) of Particle Diameter Distribution of Pigment in Inkjet Ink The particle diameter (D50) of the pigment in each inkjet ink was measured using a particle diameter analyzer UPA150 manufactured by Nikkiso Co., Ltd.

In addition, the standard deviation (sd) of particle diameter distribution of the pigment in each ink was also determined using the particle diameter analyzer UPA150.

2. Image Recording Test

Each inkjet ink was set in an inkjet printer, EM-930C manufactured by Seiko Epson Corp., and images were recorded on a recording paper, Xerox 4024 paper having a sizing degree of 32 seconds and an air permeability of 21 seconds, to evaluate the ink discharging stability of each inkjet ink and the image quality.

(1) Diffuse Reflection (Alternative Characteristic: Gloss)

The gloss of the recorded solid images were measured with a photometer VGS-1001DP manufactured by Nippon Denshoku Co., Ltd. to evaluate the diffuse reflection property of each ink. The gloss was measured at an angle of 75 degree.

(2) Clearness

The color tone of the solid image was measured with an X-rite densitometer. The color tone data were plotted on a chromaticity diagram to determine the clearness of the color image. The clearness is defined by the following formula:

$$Clearness = \sqrt{(a^2 + b^2)}$$

(3) Discharging Stability

After images were printed, the printer was allowed to settle at 40° C. for 1 month while the printing head was covered with a cap. Then the printer was operated again to evaluate the discharging stability of the ink. The discharging stability is graded as follows.

◯: Good images can be recorded after only one head cleaning operation.

Δ: Good images can be recorded after two or three head cleaning operations.

X: Good images cannot be recorded even after three head cleaning operations.

3. Preservability of Ink

Each ink was set in a polyethylene container while the container was sealed. The container was preserved at 70° C. for three weeks. The particle diameter, surface tension, and viscosity of each ink were measured before and after the preservation test to determine the preservability of the ink.

The preservability of the ink is graded as follows:

◯: The variation of the properties of the inks before and after the preservation test is within 10%.

Δ: The variation is within 30%.

X: The variation is greater than 30%.

The results are shown in Table 1.

TABLE 1

| | D50 (μm) | Sd (μm) | Gloss (%) | Clearness | Discharging property | Preservability |
|---|---|---|---|---|---|---|
| Ex. 1 | 35 | 0.30 | 50 | 62 | Δ | ◯ |
| Ex. 2 | 14 | 0.12 | 52 | 52 | Δ | Δ |
| Ex. 3 | 52 | 0.24 | 61 | 59 | ◯ | ◯ |
| Ex. 4 | 44 | 0.32 | 65 | 85 | ◯ | ◯ |
| Ex. 5 | 34 | 0.26 | 55 | 50 | ◯ | ◯ |
| Ex. 6 | 52 | 0.40 | 52 | 68 | ◯ | ◯ |
| Comp. Ex. 1 | 105 | 0.78 | 30 | 74 | Δ | Δ |

Effects of the Present Invention

As can be understood from the above description, the pigment-based inkjet ink of the present invention has good stability even when preserved under high temperature conditions. Therefore the inkjet ink can be stably discharged from inkjet printers, and images having good clearness and high gloss can be produced.

Additional modifications and variations of the present invention are possible in light of the above teachings. It is therefore to be understood that within the scope of the appended claims the invention maybe practiced other than as specifically described herein.

This document claims priority and contains subject matter related to Japanese Patent Applications Nos. 2002-314779, 2003-031668, and 2003-153739, filed on Oct. 29, 2002. Feb. 07, 2003, and May 30, 2003, respectively, the entire contents of which are herein incorporated by reference.

What is claimed as new and desired to be secured by Letters Patent of the United States is:

1. An inkjet ink comprising:
   water;
   a particulate pigment;
   a dispersant; and
   an emulsion,
   wherein the particulate pigment has an average particle diameter (D50) not greater than 100 nm, and a standard deviation of particle diameter distribution of the particulate pigment is less than one half of the average particle diameter (D50);
   wherein the elmusion comprises a silicone oil emulsion having an average particle diameter greater than the average particle diameter (D50) of the particle pigment.

2. The inkjet ink according to claim 1, wherein the emulsion is included in the inkjet ink in an amount of from 1 to 20% by weight based on total weight of the inkjet ink.

3. The inkjet ink according to claim 1, wherein the elmusion further comprises at least one polyurethane emulsion.

4. The inkjet ink according to claim 3, wherein a content of the polyurethane emulsion is from 0.1 to 20% by weight based on total weight of the inkjet ink.

5. The inkjet ink according to claim 1, wherein the dispersant is included in the inkjet ink in an amount of from 0.3 to 2 parts by weight per 1 part by weight of the particulate pigment.

6. The inkjet ink according to claim 1, wherein the dispersant comprises a compound having the following formula (1):

(1)

wherein n is an integer of from 20 to 100.

7. The inkjet ink according to claim 6, wherein the dispersant comprises polyoxyethylene (n=40) β-naphthyl ether.

8. The inkjet ink according to claim 1, wherein the particulate pigment is selected from the group consisting of self-dispersion pigments and microencapsulated pigments.

9. The inkjet ink according to claim 1, wherein the particulate pigment is selected from the group consisting of carbon black; Pigment Red 5, 7, 12, 48 (Ca), 48 (Mn), 57

(Ca), 57:1, 112, 122, 123, 146, 168, 176, 184, 185 and 202, and Pigment Violet 19; Pigment Blue 1, 2, 3, 15, 15:3, 15:4, 16, 22, 60, 63 and 66; and Pigment Yellow 1, 2, 3, 12, 13, 14, 16, 17, 73, 74, 75, 83, 93, 95, 97, 98, 114, 120, 128, 129, 138, 150, 151, 154, 155, 174 and 180.

10. An ink cartridge comprising:
a container; and
the inkjet ink according to claim 1 which is contained in the container.

11. The ink cartridge according to claim 10, further comprising:
a recording head having a nozzle from which the inkjet ink is discharged.

12. An inkjet recording apparatus comprising:
the ink cartridge according to claim 11; and
a carriage configured to carry the ink cartridge to form an image on a recording paper.

13. An inkjet recording method comprising:
discharging the inkjet ink according to claim 1 from a nozzle of a recording head to form an image on a recording paper.

14. An image formed on a recording material in accordance with the inkjet recording method of claim 13.

* * * * *

UNITED STATES PATENT AND TRADEMARK OFFICE
CERTIFICATE OF CORRECTION

| | | |
|---|---|---|
| PATENT NO. | : 7,101,919 B2 | Page 1 of 1 |
| APPLICATION NO. | : 10/694043 | |
| DATED | : September 5, 2006 | |
| INVENTOR(S) | : Hasegawa et al. | |

It is certified that error appears in the above-identified patent and that said Letters Patent is hereby corrected as shown below:

On the title page, Item (54), and Column 1, the Title is incorrect. Item (54) and Column 1 should read:

-- (54) INKJET INK, INK CARTRIDGE CONTAINING THE INKJET INK, INKJET RECORDING APPARATUS USING THE INKJET INK, INKJET RECORDING METHOD USING THE INKJET INK, AND IMAGE FORMED BY THE INKJET RECORDING METHOD --

Also, on the title page, the Foreign Application Priority Data information is incorrect. Item (30) should read:

-- (30)     Foreign Application Priority Data

| | | |
|---|---|---|
| Oct. 29, 2002 | (JP) | ............................ 2002-314779 |
| Feb. 7, 2003 | (JP) | ............................ 2003-031668 |
| May 30, 2003 | (JP) | ............................ 2003-153739 -- |

Signed and Sealed this

Twelfth Day of December, 2006

JON W. DUDAS
*Director of the United States Patent and Trademark Office*